Feb. 4, 1969     E. A. G. HAMER     3,425,562
SEMIPERMEABLE MEMBRANE CLEANING MEANS
Filed July 22, 1966
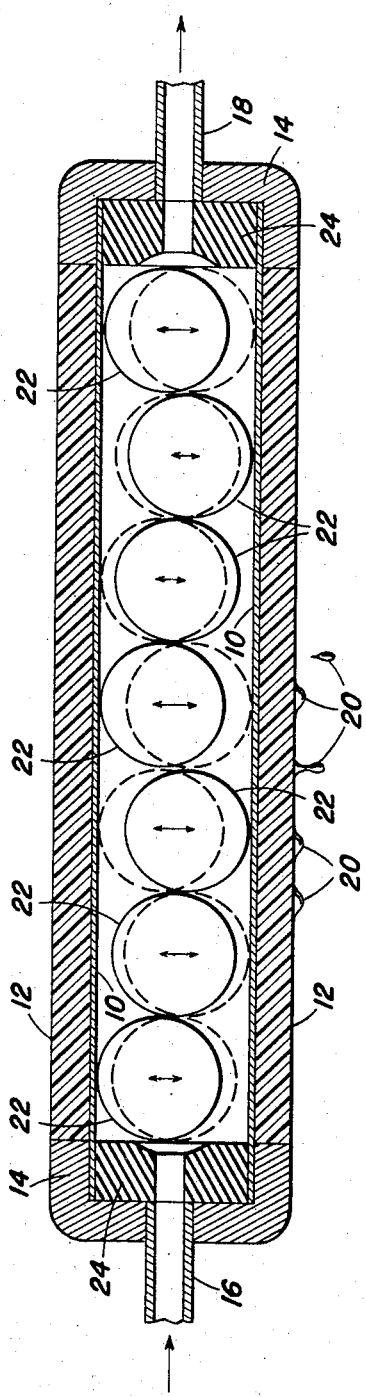
INVENTOR
Edward A. G. Hamer
BY *Eli Weiss*
ATTORNEY United States Patent Office 3,425,562
Patented Feb. 4, 1969

3,425,562
SEMIPERMEABLE MEMBRANE
CLEANING MEANS
Edward A. G. Hamer, Metuchen, N.J., assignor to
American Standard Inc., a corporation of Delaware
Filed July 22, 1966, Ser. No. 567,304
U.S. Cl. 210—321            11 Claims
Int. Cl. B01d 35/24, 13/00

ABSTRACT OF THE DISCLOSURE

An apparatus for separating a solvent from a solute by dialysis, electro-dialysis, reverse osmosis and similar processes wherein the separation is effected by passing a greater proportion of the solvent through a semipermeable membrane than the solute. A movable element is associated with the semipermeable membrane in such manner that the flow velocity and turbulence of the solute-solvent combination are both increased adjacent the face of the membrane by the movable element, thereby helping to eliminate polarization concentration adjacent the face of the membrane and also helping to dislodge any particles that may become trapped on the face of the membrane.

---

This invention relates to the partial separation of a solute from the solvent by passing said solvent preferentially through a semipermeable membrane. More particularly, this invention relates to separation by means of dialysis, electrodialysis, reverse osmosis and similar processes, and to improved methods and apparatus for carrying out such processes.

While this invention is applicable to a wide variety of separation operations, as will be apparent to those skilled in the art, it is especially beneficial in the desalination of saline or brackish water by a reverse-osmosis process, and as a matter of convenience will be described principally in terms of such a process.

In reverse osmosis processes generally, a separation of solvent from solute is achieved by passing the solution, for example brine, in contact with a semipermeable membrane under sufficient pressure to overcome the osmotic pressure across the membrane and force the solvent (e.g. water) to pass through the membrane and out of the solution, leaving the remaining solution more concentrated. This type of process is designated "reverse-osmosis" because the movement of solvent through the membrane is in a direction opposite to that which would normally be brought about by virtue of the concentration differences.

In such processes, as in the various other membrane-separation processes referred to above, there is a tendency for the efficiency of the membrane to be impaired by so-called concentration polarization. This term is used to denote a condition whereby the concentration of the solution immediately adjacent the surface of the membrane is changed by the migration of one or more components through the membrane, so that the concentration adjacent the membrane differs from that of the solution as a whole. In electrodialysis separations the film of solution in contact with the membrane becomes depleted in species of solute ions, so that there are less available to migrate through the membrane. In reverse osmosis separations, this boundary layer becomes depleted of solvent, so that the remaining solution is more concentrated in solutes as compared with the bulk of the solution on the solution side of the membrane. In either case, the separation efficiency and rate of the process are impaired, sometimes very severely.

Various expedients have been proposed for the purpose of reducing such polarization effects. In general, these have been based on increasing the degree of mixing, or turbulence, in the solution being separated. This can be done by increasing the flow rate over the membrane sufficiently to produce more turbulent flow characteristics, by employing mechanical mixing devices such as agitators and the like, or, to some extent, by introducing turbulence-promoting structures such as baffles and the like into the flow path of the solution in the vicinity of the membrane. However, it is frequently undesirable, in terms of power demand and of circulating load on the system, to employ velocities sufficiently high by themselves to produce turbulent flow conditions. Mechanical agitation is frequently impractical, particularly when it is necessary to carry out such agitation in environments characterized by high working pressures and small flow passages, such as is the case with equipment used for the reverse-osmosis desalination of brines, and baffles and the like are of limited value and frequently are incompatible with efficient design of the equipment.

An object of this invention, therefore, is to provide improved methods and apparatus for the separation of a solvent from a solute by the use of a semipermeable membrane.

Another object is to provide such methods and apparatus which are effective in overcoming polarization effects in such separations.

Still another object is to provide such methods and apparatus, which do not depend on the use of high-velocity flow rates to produce turbulent flow conditions.

A further object is to provide such methods and apparatus, which do not require the introduction of conventional mechanical agitators such as propellers and the like into the solution zone.

Another object is to provide such methods and apparatus, which do not require the use of baffles to produce local turbulences or regions of increased flow rate adjacent the surface of the membrane.

A feature of this invention is the use of a solution chamber containing a captive movable element.

Another feature is the use of a movable element adapted to be put into motion by the hydraulic force of solution flowing through said chamber.

Still another feature is the use of a movable element devoid of edges or projections.

A further feature is the provision of means for preventing escape of the movable element from the solution chamber.

According to another feature of the invention, the cross-sectional area of the solution chamber and that of the movable element therein are so related as to define an annular fluid-flow space of a non-uniform cross-sectional area.

Yet another feature is the use of a circulating pump to provide a fluid flow of pulsating character.

Another feature is the use of resilient fittings to retain said movable element in said chamber while magnifying the amplitude of vibration of the movable element.

According to still another feature of the invention, the maximum cross section of the movable element, transversely of the fluid flow path, closely approaches the internal size and shape of the chamber.

Other objects, features and advantages will become apparent from the following more complete description and claims, and the accompanying drawings.

In one particularly desirable aspect, this invention contemplates an apparatus comprising a solution chamber having an inlet and an outlet, said chamber being defined at least in part by a semipermeable membrane, a movable element in said chamber and means for retaining said movable element in said chamber.

In another particularly desirable embodiment, this invention contemplates a method for performing a separation between a solvent and at least one solute dissolved therein, said method comprising in combination the steps of flowing a solution of said solute in said solvent over a surface of a semipermeable membrane, providing a movable element adjacent said surface of said semipermeable membrane, and maintaining said movable element in a state of motion adjacent said semipermeable membrane.

The drawing is a cross-sectional representation of an apparatus according to the invention, namely a reverse-osmosis apparatus for the desalination of water.

Referring more particularly to the drawing, the apparatus according to the invention comprises a generally tubular chamber defined in large part by a tubular semipermeable membrane 10. The tubular membrane is supported from the outside by a porous tubular support member 12, as more fully described and claimed in copending application Ser. No. 508,037, filed Nov. 16, 1965 and assigned to the assignee hereof. The ends of the tubular chamber are closed by suitable fittings represented by caps 14, and provided with a suitable inlet and outlet for the solution, indicated respectively by tubes 16 and 18. In the operation of the apparatus, the solution, for example brine, is circulated under pressure through the chamber, and the solvent, for example water, migrates through the membrane 10 and its porous support 12, collecting on the outside of the support tube as indicated by drops 20, after which it drops into a suitable collector (not shown). The apparatus is shown in somewhat simplified form, various threaded connections, O-ring seals and the like being omitted in the interest of emphasizing the essential novel features of the invention.

Accordingy to the invention, there is provided in the chamber at least one, and preferably a plurality of movable elements, shown in the drawing as spheres 22. The spherical shape is preferred, although other rounded shapes may also be used. The movable elements should, however, be devoid of edges or projections capable of coming in contact with the membrane and damaging it.

The spheres 22 are smaller in diameter than the inside diameter of the chamber, and are therefore free to move radially in the chamber to a limited extent, as indicated by the double-headed arrows and further suggested by the dashed outlines showing various alternate positions of the spheres. It is preferred, however, that the difference between the diameter of the spheres and the inside diameter of the chamber be small. When the clearance between the sphere and the chamber wall is small (say, one-fifth to one-tenth of the diameter of the chamber), two advantages accrue. For one, the ratio between the maximum and the minimum annular flow space for the fluid is increased, and it is advantageous that this ratio be large, as it increases the turbulence of flow of the liquid, or at least creates a flow condition characterized by many rapid changes in direction and velocity. This helps to disrupt the boundary layer film of solution in contact with the membrane, and hence helps to overcome the polarization effects referred to above.

A second advantage obtained by the use of spheres of diameter nearly as large as the inside diameter of the solution chamber arises from the fact that the spheres are most effective to reduce the boundary layer thickness when they are in contact with, or close proximity to the surface of the membrane since it is under this condition that the linear velocity of the fluid past the membrane is at its highest. In addition, the sphere is in close proximity to the membrane (rather than at intermediate positions away from the membrane) for a greater proportion of the time.

It is also advantageous to provide for a limited degree of axial or longitudinal motion. When the spheres are free to oscillate axially as well as radially, a given sphere does not always approach the same point on the surface of the membrane, but rather tends to strike or approach the membrane at a succession of points axially spaced along the surface of the membrane. This is particularly advantageous when the solution contains solid materials in suspension. Such solid materials tend to collect on the face of the membrane and interfere with the transmission of solvent into and through the membrane. The motion of the spheres tends to dislodge such deposits and return them to suspension in the solution so that they can be exhausted with the effluent through outlet 18. This advantage obtains whether or not the spheres are free to move axially, but is most pronounced when some degree of axial motion is provided, as each sphere then tends to clear a circumferential band of appreciable width, rather than a narrow ring corresponding to the locus of tangency between the sphere and the inner surface of the membrane. Clearance for such axial motion is simply provided by making the longitudinal internal dimension of the chamber larger than the sum of the diameters of the spheres.

According to a preferred feature of the invention, there is provided a resilient fitting 24 at one or both ends of the chamber. The function of the resilient fitting is to amplify the axial oscillation of the spheres by providing an elastic rebound each time an end sphere collides with the fitting 24. For example, this resilient fitting may take the form of an elastomeric disc or a conventional coil spring.

The motion of the spheres may be provided simply by random local variations in the direction and velocity of flow, or it may be promoted by providing a pulsating flow, for example by using a piston pump or the like to generate the working pressure necessary for the reverse-osmotic separation, and allowing the resulting pulsations in pressure to be transmitted through the solution to the interior of the solution chamber.

The material of the spheres is not critical, however, in some instances it may be desirable to provide spheres which do not contaminate the solution nor suffer degradation by contact with it. Glass spheres are useful, providing the working pr essure and velocity are high enough to impact the desired motion to them. Where a lighter weight sphere is required solid spheres of a plastic material such as polyethylene may be used, or hollow plastic spheres similar to ping-pong balls, etc.

While this invention has been described in terms of certain preferred embodiments, and illustrated by way of certain drawings these are illustrative only, as many alternatives and equivalents will readily occur to those skilled in the art, without departing from the spirit or proper scope of the invention. The invention is therefore not to be construed as limited, except as set fourth in the appended claims.

What is claimed is:

1. A device for achieving separation between a solvent and a solute carried in said solvent comprising an elongated chamber having an inlet and an outlet for continuous flow of said solute-solvent combination therethrough, said chamber having a porous wall, said porous wall being defined at least in part by a semipermeable membrane capable of separating said solute and solvent by passage of a proportion of said solvent therethrough, a plurality of movable elements adjacent the face of said membrane to be exposed to said solute carried in said solvent, said movable being free to undergo a limited amount of transverse fluctuating movement within said chamber, said movable elements being arranged in tandem in said chamber along almost the entire axial length of said chamber to provide also for a limited amount of axial fluctuating movement of said movable elements in said chamber; said transverse and axial fluctuating movements being effective to reduce concentration polarization at the surface of said membrane.

2. A device as in claim 1, wherein each of said movable elements is of a size and shape to fill a major portion of said chamber in a cross-sectional plane generally normal to the direction of flow from said inlet to said outlet.

3. A device as in claim 1, further comprising means for imparting a pulsating flow characteristic to fluid introduced into said chamber through said inlet.

4. A device as in claim 1, wherein said chamber is generally cylindrical in shape.

5. A device as in claim 4, wherein said membrane is generally cylindrical in shape and of a length substantially equal to the length of said chamber, said membrane defining the inner radius of said chamber.

6. A device as in claim 1, wherein said movable elements are generally spherical in shape.

7. A device as in claim 6, wherein said movable elements are made of glass.

8. A device as in claim 6, wherein said movable elements are made of plastic.

9. A device as in claim 6, wherein said movable elements are hollow.

10. A device as in claim 6, wherein said inlet and said outlet are of smaller cross-section than said chamber.

11. A device as in claim 6, wherein said device further comprises resilient means disposed therein for ampliyifying the movement of said movable elements.

References Cited

UNITED STATES PATENTS

| | | | |
|---|---|---|---|
| 2,641,364 | 6/1953 | Depallens | 210—356 |
| 2,664,395 | 12/1953 | Marchand | 210—321 |
| 2,964,124 | 12/1960 | Peirls et al. | 55—158 X |
| 3,206,397 | 9/1965 | Harvey | 210—321 X |
| 3,250,701 | 5/1966 | Watson et al. | 210—19 X |
| 3,276,996 | 10/1966 | Lazare | 210—22 |
| 3,312,349 | 4/1967 | Rosaen | 210—315 X |
| 3,332,746 | 7/1967 | Claff et al. | 210—321 X |
| 3,352,422 | 11/1967 | Heden | 210—321 |

FOREIGN PATENTS

| | | |
|---|---|---|
| 936,421 | 9/1963 | Great Britain. |

OTHER REFERENCES

Feinstein, "An Apparatus for Increasing the Speed of Dialysis of Small Quantities of Fluids", from J. Lab & Clin. Med., 40:2, August 1952, pp. 313–315.

Havens Industries, "Sea Water Conversion", March 1964, 10 pages, pp. 2–10 relied upon.

REUBEN FRIEDMAN, *Primary Examiner.*

FRANK A. SPEAR, JR., *Assistant Examiner.*

U.S. Cl. X.R.

210—353, 355, 414.